US008333085B2

(12) United States Patent
Hipp-Kalthoff et al.

(10) Patent No.: US 8,333,085 B2
(45) Date of Patent: Dec. 18, 2012

(54) CONDENSATION WATER OVERFLOW PROTECTOR FOR AN EVAPORATOR

(75) Inventors: Christoph Hipp-Kalthoff, Simmozheim (DE); Klaus Voigt, Bietigheim-Bissingen (DE); Alexander Argento, Ludwigshafen (DE)

(73) Assignee: Behr Industry GmbH & Co. KG, Stuttgart (DE)

( * ) Notice: Subject to any disclaimer, the term of this patent is extended or adjusted under 35 U.S.C. 154(b) by 574 days.

(21) Appl. No.: 12/563,383

(22) Filed: Sep. 21, 2009

(65) Prior Publication Data
US 2010/0071398 A1 Mar. 25, 2010

(30) Foreign Application Priority Data

Sep. 19, 2008 (DE) .......................... 10 2008 048 156

(51) Int. Cl.
*F25D 21/14* (2006.01)
*F28F 1/10* (2006.01)

(52) U.S. Cl. ................ 62/285; 62/288; 62/290; 62/291; 165/172; 165/149

(58) Field of Classification Search .................... 62/285, 62/288, 290, 291, 515; 165/55, 70, 98, 149, 165/173–174
See application file for complete search history.

(56) References Cited

U.S. PATENT DOCUMENTS

| 4,353,224 | A | * | 10/1982 | Nonogaki et al. | 62/515 |
| 6,044,656 | A | * | 4/2000 | Shirota et al. | 62/244 |
| 6,286,328 | B1 | * | 9/2001 | Kawahara | 62/285 |
| 2002/0023455 | A1 | * | 2/2002 | Kosugi et al. | 62/285 |
| 2005/0126216 | A1 | * | 6/2005 | Hammonds et al. | 62/515 |
| 2005/0229619 | A1 | * | 10/2005 | Monnier et al. | 62/285 |
| 2006/0065388 | A1 | | 3/2006 | Newman et al. | |
| 2006/0112709 | A1 | * | 6/2006 | Boyle | 62/272 |
| 2006/0272346 | A1 | * | 12/2006 | Huang | 62/285 |
| 2007/0023162 | A1 | | 2/2007 | Kim et al. | |
| 2007/0113574 | A1 | * | 5/2007 | Davenport et al. | 62/285 |

FOREIGN PATENT DOCUMENTS

| DE | 32 23 812 A | 12/1983 |
| DE | 34 36 539 C1 | 4/1986 |
| DE | 9308019.0 | 8/1993 |
| DE | 44 10 120 C2 | 6/1995 |
| EP | 1 970 230 A1 | 9/2008 |
| JP | 11-192834 | 7/1999 |

* cited by examiner

*Primary Examiner* — Frantz Jules
*Assistant Examiner* — Joseph Trpisovsky
(74) *Attorney, Agent, or Firm* — Muncy, Geissler, Olds & Lowe, PLLC

(57) ABSTRACT

An evaporator, in particular for a motor vehicle air conditioner, is provided that includes at least one block constructed largely of tube elements and rib elements, whereby it is possible for a refrigerant to flow through the tube elements, at least one section of the block being provided with a condensation water overflow protection means, which includes at least one restriction plate, the height of the restriction plate in at least one section being lower than a height in at least one second section adjacent to the first section.

17 Claims, 4 Drawing Sheets

CONDENSATION WATER OVERFLOW PROTECTOR FOR AN EVAPORATOR

This nonprovisional application claims priority under 35 U.S.C. §119(a) to German Patent Application No. DE 10 2008 048 156.4, which was filed in Germany on Sep. 19, 2008, and which is herein incorporated by reference.

BACKGROUND OF THE INVENTION

1. Field of the Invention

The invention relates to an evaporator, in particular for a motor vehicle air conditioner.

2. Description of the Background Art

Motor vehicle air conditioning systems known from the conventional art usually have a refrigerant circuit in which the refrigerant passes through a condenser, an expansion valve, an evaporator and a compressor. The evaporator is used in the refrigerant circuit to convert the refrigerant, which is metered by the expansion valve situated upstream from the refrigerant circuit and injected in expanded form, from the liquid state to the gas phase. The refrigerant, which has exited the expansion valve and is no longer under pressure, gradually converts to the gaseous state when it passes through the evaporator, for which purpose the heat previously removed in the condenser of the air conditioner is again required in the form of evaporation heat. The required heat is removed from the interior air of the vehicle, which is conducted past a fan, thereby producing cold air which is fed back into the vehicle interior.

By cooling the air flow in the evaporator, the moisture contained in the air flow condenses onto the cool surface of the evaporator, thereby forming water droplets which drip onto the outflow side of the evaporator due to gravity, where they are then collected and removed by a corresponding device, for example a collecting tank.

DE 44 10 120 C2 describes an air conditioner for a motor vehicle, in which the condensation liquid accumulating in the housing of the air conditioner is easily collected and discharged from the air conditioner. For this purpose, a duct is provided in the bottom of the housing of a refrigerant evaporator, this duct running in an area below the evaporator and ending in an opening which is provided at the lowest point below a radiator disposed adjacent to the evaporator.

However, it is important not only to quickly and effectively discharge condensation water from the air conditioner, but also—particularly in commercial vehicles such as tractors and towing vehicles—there is the problem of the overflowing of condensation water which has been collected but not yet discharged from the air conditioner when a vehicle of this type travels at a steep angle uphill or downhill.

Commercial vehicles of this type, such as the aforementioned tractors and towing vehicles, may be subjected to uphill and downhill slopes of up to 25°. To avoid unwanted spillover of the condensation water collected below the evaporator, a housing restriction plate is additionally provided in front of and behind the evaporator of the motor vehicle air conditioner as protection in these types of vehicles. However, particularly in this type of commercial vehicle, a large air flow, which is fed through the evaporator, is required in order to achieve the desired cooling capacity. By providing the housing restriction plate, however, the flow cross section or the evaporator surface subject to the air flow is partially blocked by the restriction plate and thereby reduced in size, which results in an unwanted reduction in the capacity of the motor vehicle air conditioner.

SUMMARY OF THE INVENTION

The object of the present invention is therefore to provide an evaporator for motor vehicles, in which an effective means of preventing spillover is provided which does not or only slightly impair the cooling capacity.

According to an embodiment of the invention, an evaporator, in particular for a motor vehicle air conditioner, is provided which comprises at least one block constructed largely of tube elements and rib elements, it being possible for a fluid, in particular a refrigerant, to flow through the tube elements, and at least one section of the block being surrounded by a condensation water overflow protector that has at least one restriction plate. According to the invention, the restriction plate in at least one first section can have a reduced height compared to a height in at least one second section adjacent to the first section. Due to the configuration according to the invention, the evaporator surface subject to the air flow is only slightly reduced in size, since the first section is provided with a lower height than the at least one second section adjacent to the first section, which means that more air may flow through the evaporator, which, in turn, results in improved cooling capacity. However, due to the fact that the adjacent section has a greater height than the first section, an effective means for preventing condensation water from spilling out of the housing is established.

According to an embodiment, the first section can be disposed in the center with regard to the restriction plate.

According to another embodiment, the second and third sections can be provided with a mirror-symmetrical design with regard to a transverse axis which passes through the block and the first section of the restriction plate.

Further, the restriction plate can have a beveled upper edge in the second and third sections, starting from the first section in each case.

Alternatively, the restriction plate may have a rounded upper edge in the second and third sections, starting from the first area in each case.

The height of the second and third sections can be variable, the height increasing in the direction of the outer side of the restriction plate in each case.

Even further, the height in the second and third sections can increase continuously in the direction of the outer side of the restriction plate.

The condensation water protector can be on a housing, the housing having a condensation water outlet.

A condensation water hose for discharging the condensation water from the housing can be provided in the housing.

According to an embodiment, the condensation water hose can be fed out of one side of the housing.

According to a further embodiment, the ratio between the maximum height of the second section and the minimum height of the first section lies within a range of 1.01:1 to 4:1, and the ratio between the maximum height of the third section and the minimum height of the first section lies within a range of 1.01:1 to 4:1. The ratio between the greater height of the outer second and third sections and the lower height of the first central section is largely determined by the dynamics of vehicle movement, the position of the discharge pipe, the inclined position of the vehicle and the continuation of the condensation water hose. The evaporator is thus easily adaptable to the conditions of vehicle use by suitably setting the aforementioned size ratios.

The restriction plate can be disposed along a lower front of the block and/or along a lower back of the block in order to provide protection against condensation water overflow.

According to a further embodiment, the restriction plate on the front of the block and the restriction plate on the back of the block can have a largely identical design.

Also, the restriction plate on the front of the block and the restriction plate on the back of the block can be connected by respective transverse walls of the housing, which are of a height that corresponds at least to the maximum height of the second and third sections. This effectively prevents condensation water from possibly overflowing or spilling from the side.

According to the invention, a motor vehicle air conditioner is additionally provided, which has at least one evaporator of the type described above. The motor vehicle air conditioner according to the invention ensures effective and reliable cooling of the vehicle interior, in particular in commercial vehicles that are used to travel up and down steep slopes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
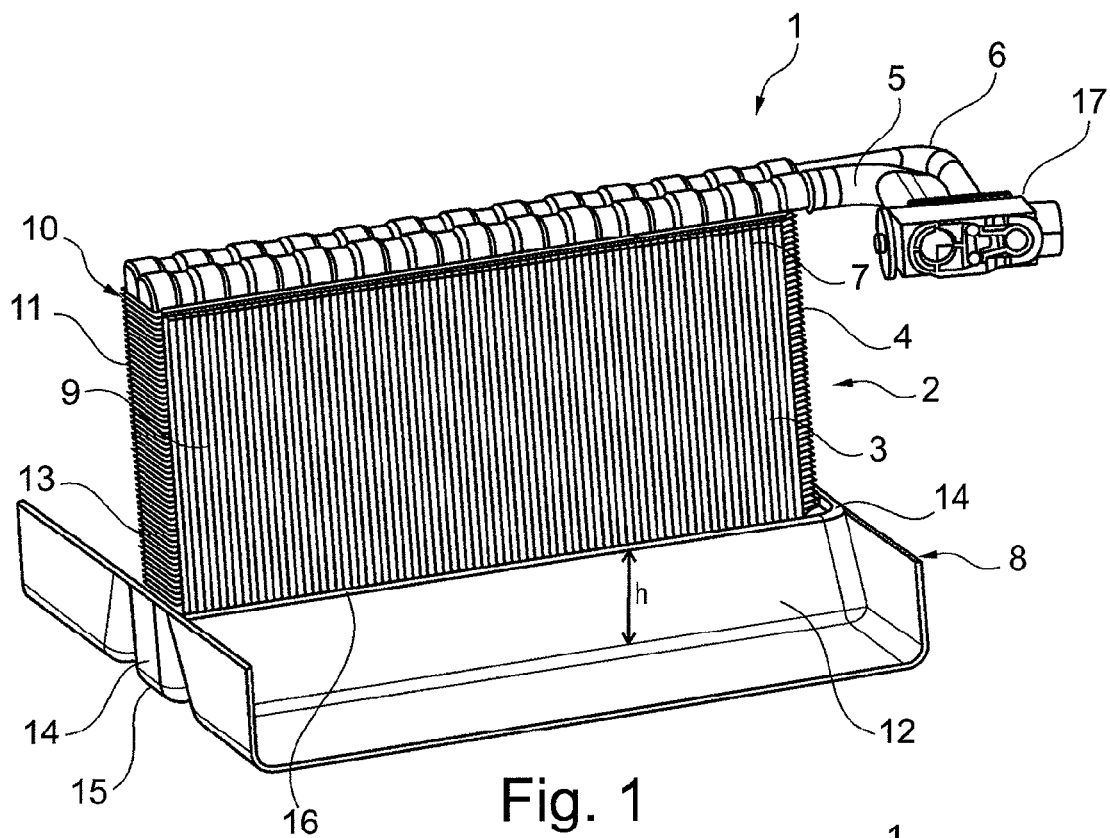
FIG. 1 shows a perspective view of an evaporator according to the conventional art.

FIG. 1 shows a perspective view of an evaporator 1 according to the prior art. Evaporator 1 comprises a block 2 which is provided with a plurality of parallel tube elements 3 which are designed as flat tubes, and a plurality of rib elements 4 which are designed as corrugated ribs, tube elements 3 and rib elements 4 being disposed in an alternating manner. An injection tube 5 and a suction tube 6, each of which is connected to an expansion valve 17, are disposed on the top of block 2. An upper collection tank, which is mountable on upper section 10 of block 2, is not illustrated in further detail in the Figure. The refrigerant is supplied through injection tube 5 to several of upper tube ends 7 of tube elements 3, conducted through the tube elements, exits at the diametrically opposed tube ends, which in the figure are covered by housing 8 or restriction plate 12 provided on housing 8, reversed and conducted back through those tube elements 3 that are not supplied with refrigerant by injection tube 5 in order to reach suction tube 6 in upper section 10 of block 2 and to be discharged from block 2 by the suction tube.

The refrigerant is evaporated in the manner described above in connection with the prior art, and air is cooled in the manner also described therein, a relatively warm air flow impinging upon front 9 of block 2 in a largely perpendicular manner, flowing through rib elements 4 and exiting in cooled form at back 11 of block 2.

The surface effectively subject to the air flow on front 9 of block 2 is greatly reduced in size by restriction plate 12 provided on housing 8, which covers a lower section 13 of block 2. A restriction plate 12 of identical design is provided on back 11 of block 2. Restriction plates 12, each of which is disposed on front 9 and back 11, are connected by transverse walls 14 and together with restriction plates 12 and a bottom 15 of housing 8 form a box-like or trough-like container which is open on top and has a circumferential, straight upper edge 16. In the configuration known from the prior art, height h of both restriction plates 12 and transverse walls 14 is the same.

Figure 2:
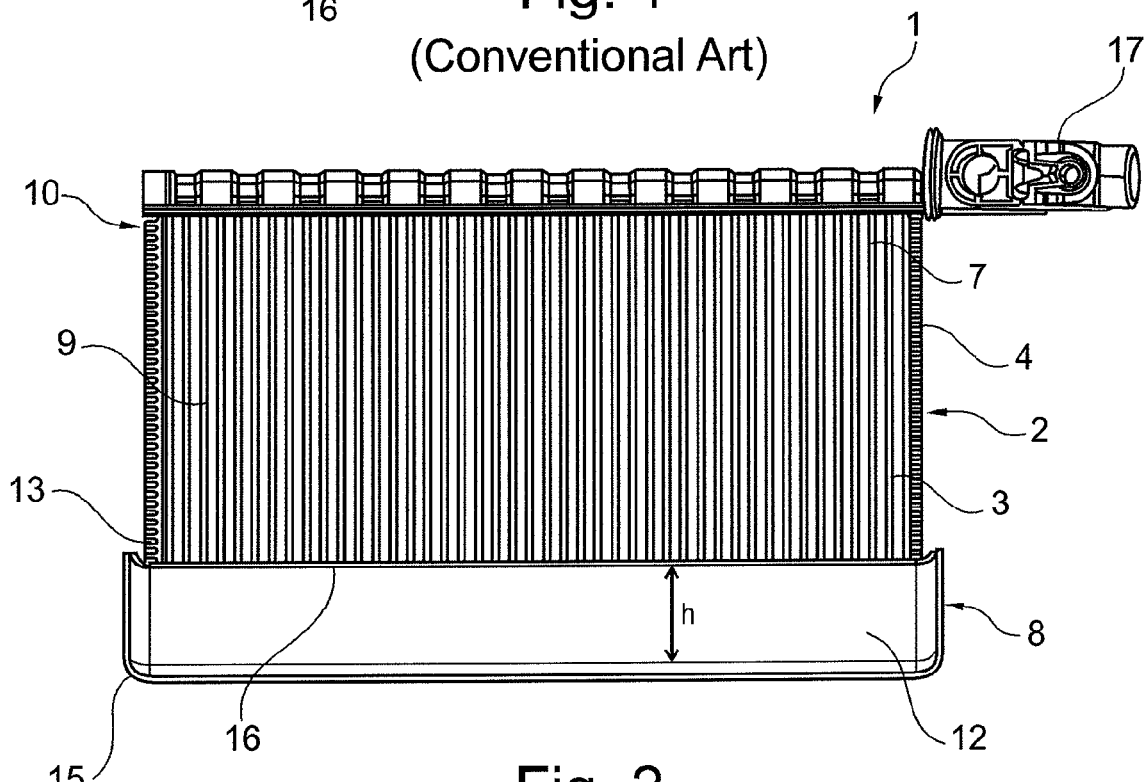
FIG. 2 shows a front view of the evaporator from FIG. 1.

FIG. 2 shows a front view of evaporator 1 from FIG. 1. The figure clearly shows, in particular, how the surface, which is subject to the air flow in a largely frontal manner on front 9 of block 2, is reduced in size by approximately 20%, which greatly impairs the capacity of evaporator 1.

Figure 3:
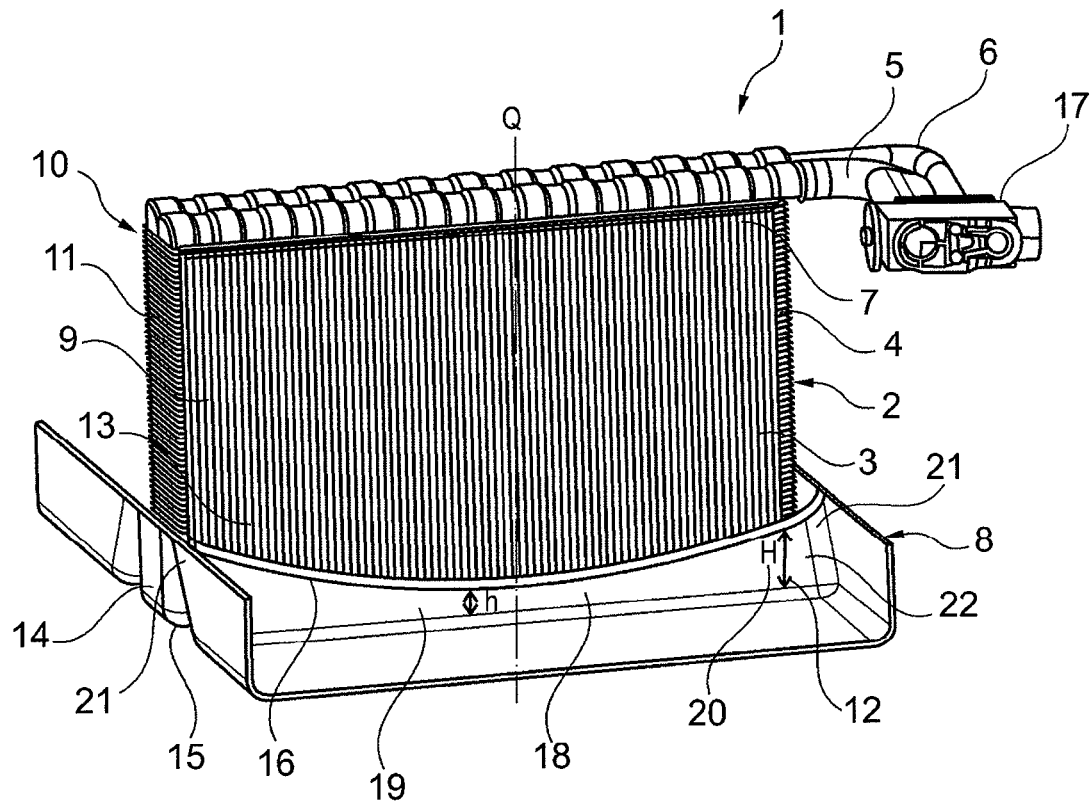
FIG. 3 shows a perspective view of an evaporator according to one embodiment.

FIG. 3 shows a perspective view of an evaporator 1 according to one embodiment. Evaporator 1 is constructed in largely the same manner as evaporator 1 described in connection with FIGS. 1 and 2 above, and it has a block 2 having alternately disposed tube elements 3 and rib elements 4 in the form of flat tubes and corrugated ribs. An injection tube 5 and a suction tube 6, which are connected to an expansion valve 17, are provided in upper section 10 of block 2. The refrigerant flows through block 2 or its tube elements 2 in the manner described above, whereby air which impinges upon front 9 of block 2 in a largely frontal manner is being cooled and exits at back 11.

However, evaporator 1 according to the embodiment differs from evaporator 1 described in connection with FIGS. 1 and 2 by the design of restriction plates 12 provided on housing 8, which are disposed on front 9 and on back 11 of block 2 at its lower section 13. Restriction plates 12 disposed on front 9 and back 11 of block 2 are also connected to each other by particular transverse walls 14 and form a container which is open on top and in which lower section 13 of block 2 is disposed. However, restriction plates 12 each have different sections of a different height h.

Figure 4:
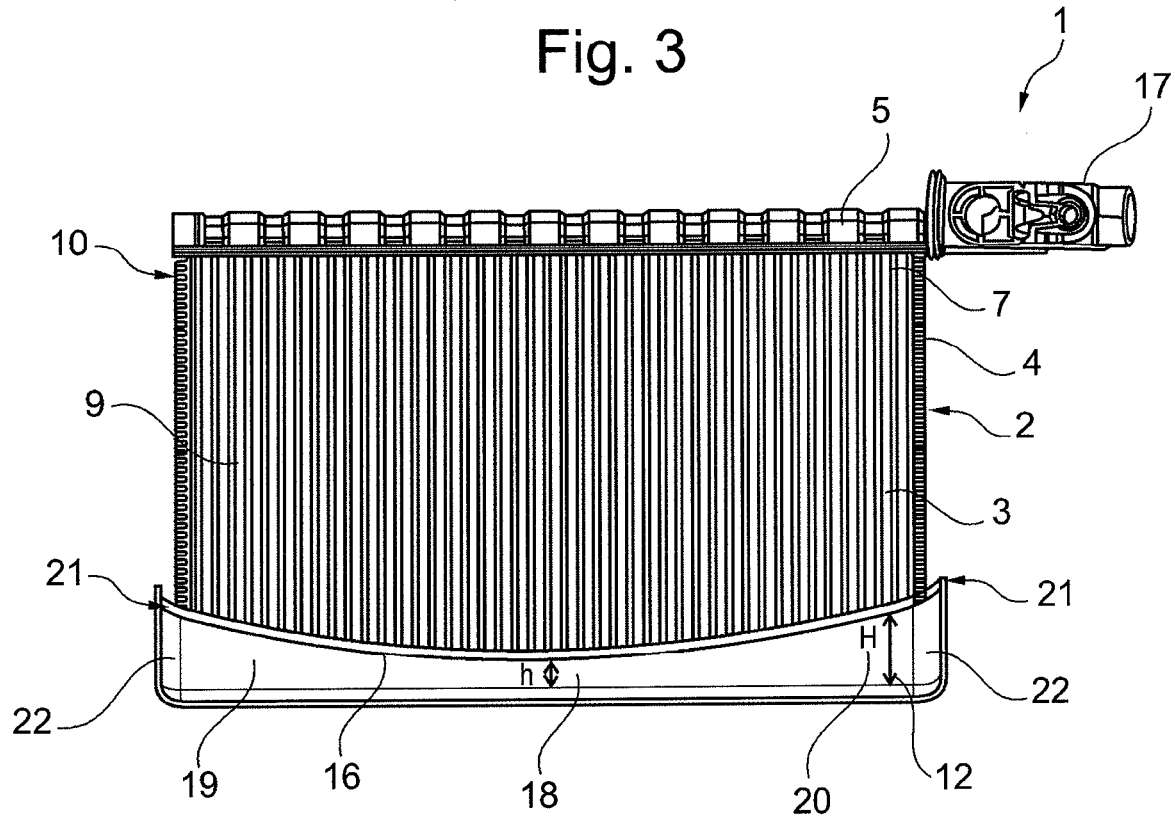
FIG. 4 shows a front view of the evaporator from FIG. 3.

The front view shown in FIG. 4 of evaporator 1 from FIG. 3 indicates that, in contrast to straight circumferential edge 16 from FIGS. 1 and 2, edge 16 of restriction plate 12 is rounded, so that height h of restriction plate 2 in a first section 18, which is situated largely in the center of restriction plate 13, is slightly lower than height h in a second section 19 and a third section 20, which are disposed adjacent to and to the right and left of first section 18. Second section 19 and third section 20 are provided with a mirror-symmetrical design with regard to a transverse axis Q of block 2 or of restriction plate 12. The design of restriction plate 12 provided on back 11 of block 2 is largely identical to the design of restriction plate 12 on front 9. Due to this configuration, the surface effectively subject to the air flow is much larger on front 9 of block 2 than it is in an evaporator 1 known from the prior art, which increases the capacity of evaporator 1.

Figure 5:
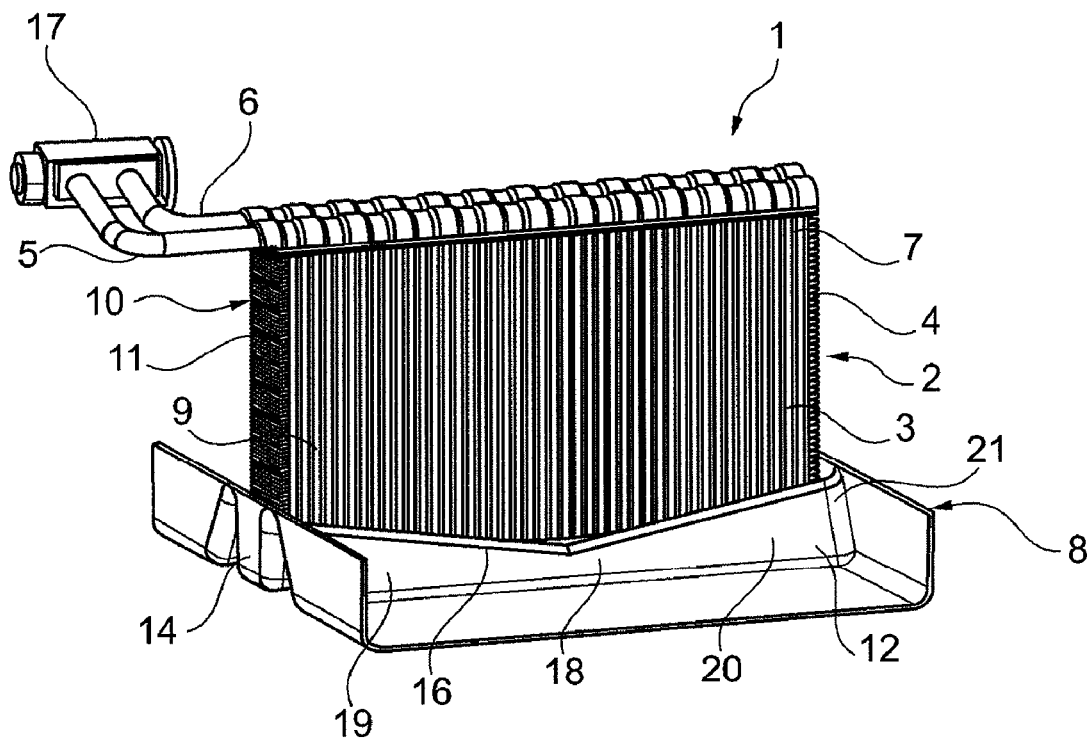
FIG. 5 shows a perspective view of an evaporator according to a further embodiment.
Figure 6:
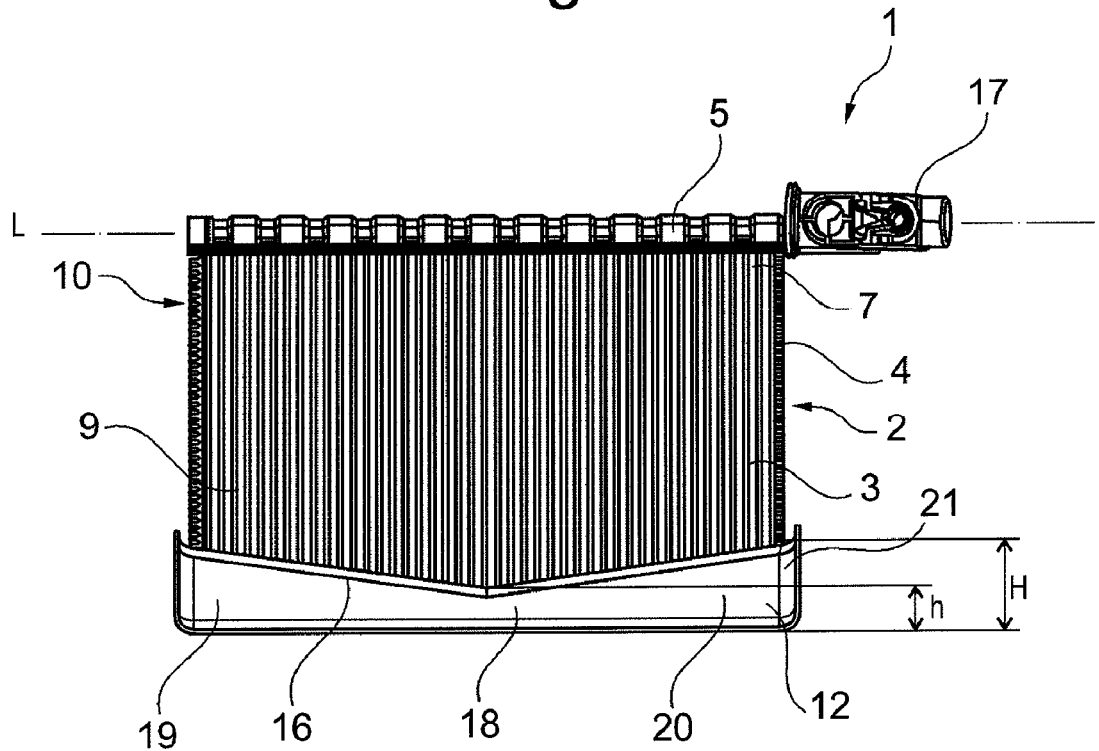
FIG. 6 shows a front view of the evaporator from FIG. 5.

FIG. 5 shows a perspective view of a further embodiment of evaporator 1. The design of evaporator 1 is again largely identical to evaporators 1 described above in connection with the embodiments in FIGS. 1 through 4, but differs in the design of restriction plate 12. As in the front view shown in FIG. 6 of evaporator 1 illustrated in FIG. 5, upper edge 16 of the restriction plate in this embodiment has a largely V-shaped design, the lowest section being provided in the center of restriction plate 12 in first section 18, and height H in second section 19 and third section 20 increasing or decreasing continuously in the direction of a particular outer side 21 of block 2. The ratio between maximum height H of second section 19 or third section 20 and minimum height h of first section 18 H:h may lie within a range of 1.01:1 to 4:1 in order to provide effective protection against spillover. It is important for maximum height H to be provided in respective external edge areas 22 of second section 19 and third section 20. If evaporator 1 is disposed within the vehicle in such a way that longitudinal axis L of the evaporator is oriented largely parallel to the longitudinal axis of a motor vehicle, the condensation water collected in the trough-like container formed by the two restriction plates 12, transverse walls 14 and bottom 15 of housing 8 and sloshing in the direction of outer edge areas 22 when the vehicle speed increases or decreases, where the water is prevented from flowing over the wall by the higher design of restriction plate 12 in these areas. Since the occurring lateral accelerations, which affect the collected condensation water, are comparatively low, it is possible to design the middle first section 18 with a lower height h so that the area effectively subject to flow is enlarged on front 9 of block 2 for the purpose of increasing capacity.

Figure 7:
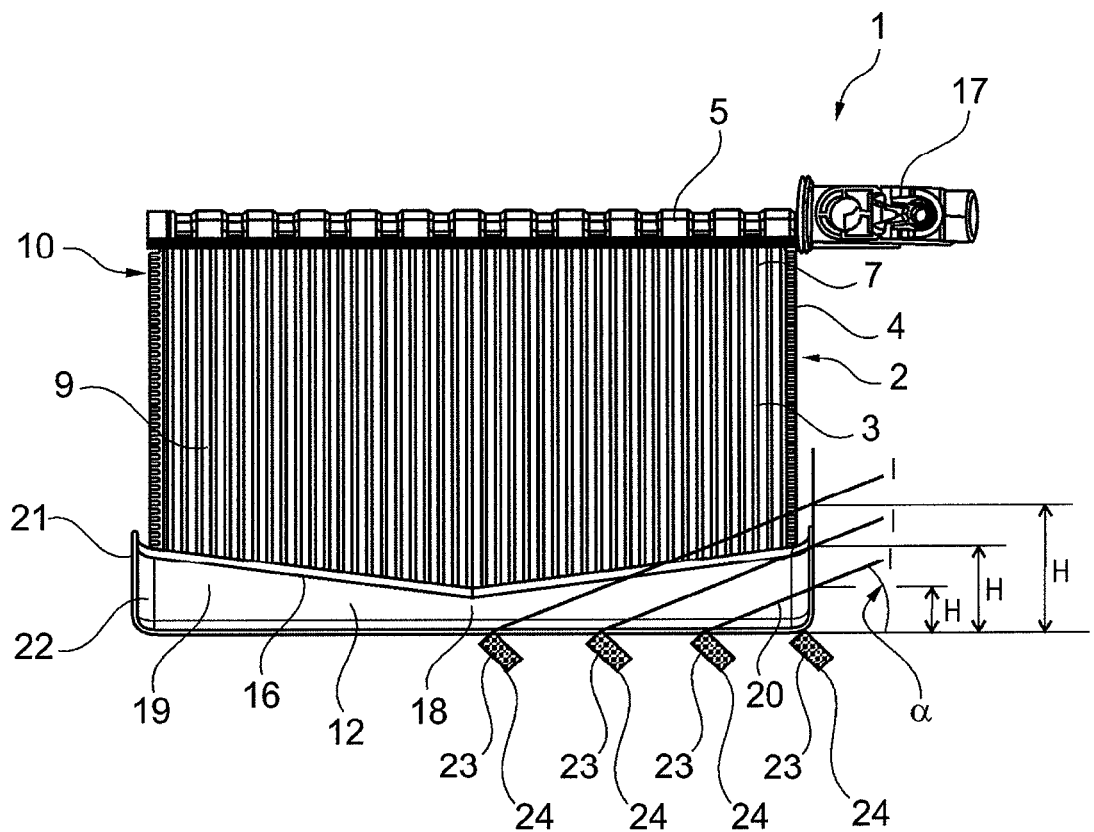
FIG. 7 shows a front view of the evaporator from FIG. 5.

FIG. 7 shows a further front view of evaporator 1 from FIG. 5, line I indicating different inclined states of a motor vehicle, thereby determining, on the one hand, height H of restriction plate 12 required for overflow protection, and on the other hand, also outlet angle α of the condensation water in connection with the inclined state of the motor vehicle, which in turn determines the position of a condensation water outlet 23 to which the condensation water is supplied by hoses 24 indicated in the figure. The figure shows different maximum inclined positions of a motor vehicle, to each of which is assigned a particular maximum height H of restriction plate 12 and a particular position of a hose 24. In fact, however, a single hose 24 is sufficient for discharging the collected condensation water.

Figure 8:
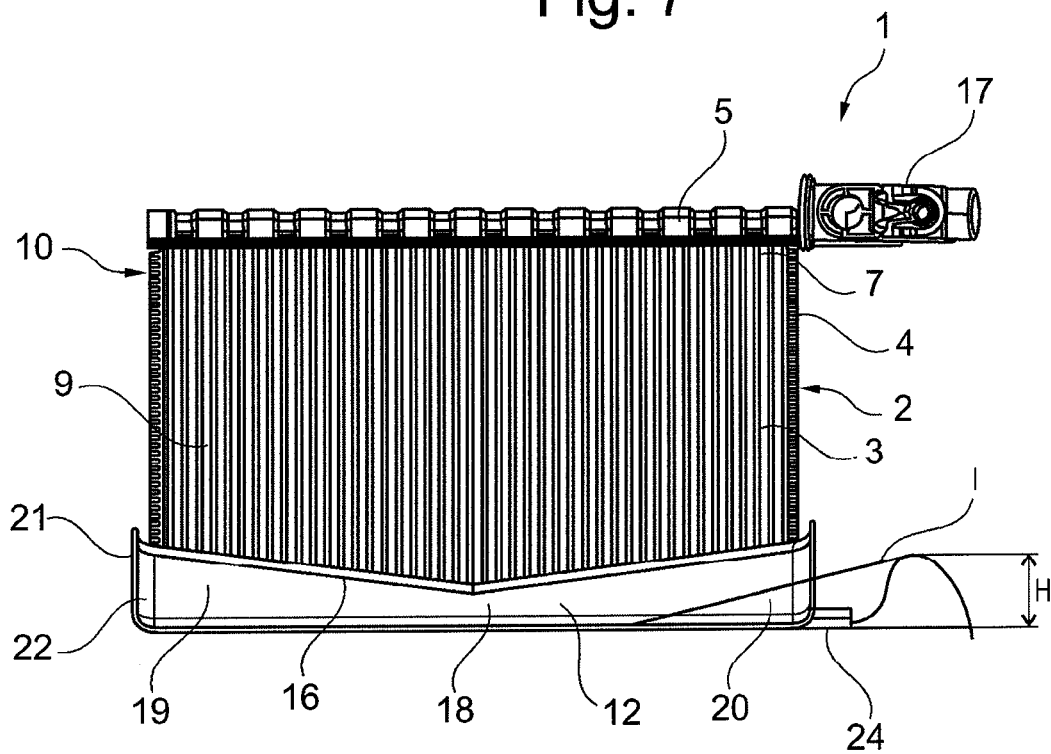
FIG. 8 shows a further front view of the evaporator from FIG. 5.

Finally, FIG. 8 shows a further front view of evaporator 1 from FIG. 5. In this embodiment, hose 24 is positioned in such a way that it exits through transverse wall 14 on the side. Height H of restriction plate 12, which is indicated by line I and is at least required due to the inclined position in order to provide overflow protection, is also illustrated.

Viewed as a whole, the configuration according to the invention will provide an evaporator of improved capacity, in particular for motor vehicles which are designed to travel up and down extremely steep slopes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An evaporator for a motor vehicle air conditioner, the evaporator comprising:
   at least one block configured of tube elements and rib elements, the tube elements being configured for a refrigerant to flow there through; and
   a condensation water overflow protector configured to surround at least one section of the block, the condensation water overflow protector with perforated side walls having at least one restriction plate parallel to the at least one section of the block defining a trough-like container, a height of the restriction plate being lower in at least one first section than at least one second section that is adjacent to the first section, the at least one restriction plate comprising a front restriction plate partially blocking airflow through a front of the evaporator and a back restriction plate partially blocking airflow through a rear of the evaporator, wherein the height of the restriction plate increase continuously from a center of the block toward a first edge of the block and toward a second edge of the block.

2. The evaporator according to claim 1, wherein the first section is disposed in the center with regard to the restriction plate and including a third section adjacent to the first section.

3. The evaporator according to claim 2, wherein the second and third sections have a substantially mirror-symmetrical design with respect to a transverse axis, which runs through the block and the first section.

4. The evaporator according to claim 2, wherein the restriction plate has a beveled upper edge in the second and third sections, starting at the first section in each case.

5. An evaporator for a motor vehicle air conditioner, the evaporator comprising:
   at least one block configured of tube elements and rib elements, the tube elements being configured for a refrigerant to flow there through; and
   a condensation water overflow protector with perforated side walls configured to surround at least one section of the block, the condensation water overflow protector having at least one restriction plate parallel to the at least one section of the block defining a trough-like container, a height of the restriction plate being lower in at least one first section than at least one second section or at least one third section adjacent to the first section,
   wherein the first section is disposed in a center with regard to the restriction plate, and
   wherein the restriction plate has a rounded edge in the second and third sections, starting at the first section in each case, and wherein the height of the restriction plate increases continuously from the toward a first edge of the block and toward a second edge of the block.

6. The evaporator according to claim 2, wherein the height in the second and third sections increases in a direction of an outer side of the restriction plate.

7. The evaporator according to claim 2, wherein a ratio between a maximum height of the second section and a minimum height of the first section lies within a range of 1.01:1 to 4:1, and a ratio between the maximum height of the third section and the minimum height of the first section lies within a range of 1.01:1 to 4:1.

8. The evaporator according to claim 1, wherein the condensation water protector is provided on a housing, the housing having a condensation water outlet.

9. The evaporator according to claim 8, wherein a hose for discharging the condensation water from the housing is provided in the housing.

10. The evaporator according to claim 1, wherein the front restriction plate is disposed along a lower front of the block and the back restriction plate is disposed along a lower back of the block in order to provide protection against condensation water overflow.

11. The evaporator according to claim 10, wherein the front restriction plate and the back restriction plate have a substantially identical design.

12. The evaporator according to claim 10, wherein the front restriction plate and the back restriction plate are connected by respective transverse walls of the housing, which are at least as high as a maximum height of the second and third sections.

13. The evaporator according to claim 9, wherein the hose is fed out through a transverse wall on a side of the housing.

14. A motor vehicle air conditioner, wherein the motor vehicle air conditioner has at least one evaporator according to claim 1.

15. The evaporator according to claim 1, wherein the front restriction plate overlies a lower portion of the front of the block and the back restriction plate overlies a lower portion of the back of the block.

16. The evaporator according to claim 1, wherein a top edge of the front restriction plate is concave.

17. The evaporator according to claim 1, wherein the front restriction plate is parallel to the front of the block and the back restriction plate is parallel to the back of the block.

* * * * *